(12) United States Patent
Ng et al.

(10) Patent No.: US 7,725,568 B2
(45) Date of Patent: May 25, 2010

(54) METHOD AND APPARATUS FOR NETWORK STORAGE FLOW CONTROL

(75) Inventors: Chan Ng, San Jose, CA (US); Rahim Ibrahim, Mountain View, CA (US); Nghiep Tran, San Jose, CA (US); Glenn Yu, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1194 days.

(21) Appl. No.: 10/238,409

(22) Filed: Sep. 9, 2002

(65) Prior Publication Data

US 2004/0049564 A1    Mar. 11, 2004

(51) Int. Cl.
*G06F 15/173* (2006.01)

(52) U.S. Cl. ............... 709/223; 709/224; 709/231; 709/234; 707/10; 711/152; 370/254; 370/401

(58) Field of Classification Search .......... 709/224, 709/231, 234; 707/10; 711/152; 370/254, 370/401
See application file for complete search history.

(56) References Cited

U.S. PATENT DOCUMENTS

| | | | | |
|---|---|---|---|---|
| 6,216,173 B1 * | 4/2001 | Jones et al. | ............ | 715/705 |
| 6,594,701 B1 * | 7/2003 | Forin | ............ | 709/232 |
| 6,714,984 B2 * | 3/2004 | Jones et al. | ............ | 709/230 |
| 6,732,104 B1 * | 5/2004 | Weber | ............ | 707/10 |
| 6,757,738 B1 * | 6/2004 | Cao et al. | ............ | 709/233 |
| 6,763,423 B2 * | 7/2004 | Stakutis et al. | ............ | 711/5 |
| 6,850,965 B2 * | 2/2005 | Allen | ............ | 709/203 |
| 6,854,035 B2 * | 2/2005 | Dunham et al. | ............ | 711/117 |
| 6,898,593 B1 * | 5/2005 | Mulukutla et al. | ............ | 707/3 |
| 7,031,313 B2 * | 4/2006 | Yazaki et al. | ............ | 370/392 |
| 7,133,929 B1 * | 11/2006 | Shah | ............ | 709/241 |
| 7,161,700 B2 * | 1/2007 | Nunokawa et al. | ............ | 358/1.15 |
| 7,185,062 B2 * | 2/2007 | Lolayekar et al. | ............ | 709/213 |
| 7,200,144 B2 * | 4/2007 | Terrell et al. | ............ | 370/389 |
| 7,203,743 B2 * | 4/2007 | Shah-Heydari | ............ | 709/223 |
| 7,212,622 B2 * | 5/2007 | Delaney et al. | ............ | 379/221.02 |
| 7,334,044 B1 * | 2/2008 | Allen | ............ | 709/233 |
| 7,383,338 B2 * | 6/2008 | Allen | ............ | 709/226 |
| 7,447,197 B2 * | 11/2008 | Terrell et al. | ............ | 370/360 |
| 7,516,187 B2 * | 4/2009 | Kim et al. | ............ | 709/208 |
| 7,516,233 B2 * | 4/2009 | Wang | ............ | 709/231 |

(Continued)

*Primary Examiner*—Hassan Phillips
*Assistant Examiner*—Backhean Tiv
(74) *Attorney, Agent, or Firm*—Wiesner & Associates; Leland Wiesner

(57) ABSTRACT

A method and apparatus for collecting information from ports on a storage network and performing flow control is provided. The data collection method and apparatus includes, identifying a data type transported on the storage network, selecting a port-storage identifier to measure the data type transported across the storage network, monitoring the port-storage identifier on the storage network for the data type, and enumerating occurrences of the data type associated with the port-storage identifier while monitoring the port-storage identifier and the data type. The flow-control operation receives information on a data type passing through the storage network according to a port-storage identifier, compares a threshold with the data type passing through the storage network according to a port-storage identifier, determines when the threshold associated with the data type has been exceeded in consideration of the information received, queues in response to the determination the data type scheduled to pass through one or more ports and storage devices identified according to the port-storage identifier on the storage network.

13 Claims, 9 Drawing Sheets

U.S. PATENT DOCUMENTS 7,568,046 B2 * 7/2009 Allen .................... 709/233
2001/0047460 A1 * 11/2001 Kobayashi et al. .......... 711/162
2002/0004819 A1 * 1/2002 Agassy et al. ............. 709/203
2002/0156987 A1 * 10/2002 Gajjar et al. ............. 711/203
2002/0191649 A1 * 12/2002 Woodring ................. 370/906
2003/0131182 A1 * 7/2003 Kumar et al. ............. 711/5

* cited by examiner

FIG. 8A

| Measured Statistics | Read | Write | Read/Time | Write/Time |
|---|---|---|---|---|
| Commands | ITL(Rcmds) | ITL(Wcmds) | ITL(Rcmds)/t | ITL(Wcmds)/t |
| Data Blocks | ITL(RB) | ITL(WB) | ITL(RB)/t | ITL(WB)/t |
| Frames | ITL(RF) | ITL(WF) | ITL(RF)/t | ITL(WF)/t |

FIG. 8B

| Data Type | $\Sigma_{Initiator(I)}$ | $\Sigma_{Target(T)}$ | $\Sigma_{LUN(L)}$ | $\Sigma_I \Sigma_T$ | $\Sigma_I \Sigma_L$ | $\Sigma_T \Sigma_L$ | $\Sigma_I \Sigma_T \Sigma_L$ |
|---|---|---|---|---|---|---|---|
| CMD | $\Sigma_I$ ITL(Rcmds) | $\Sigma_T$ ITL(Rcmds) | $\Sigma_L$ ITL(Rcmds) | $\Sigma_I \Sigma_T$ ITL(Rcmds) | $\Sigma_I \Sigma_L$ ITL(Rcmds) | $\Sigma_T \Sigma_L$ ITL(Rcmds) | $\Sigma_I \Sigma_T \Sigma_L$ ITL(Rcmds) |
| CMD/T | $(\Sigma_I$ ITL(Rcmds))/t | $(\Sigma_T$ ITL(Rcmds))/t | $(\Sigma_L$ ITL(Rcmds))/t | $(\Sigma_I \Sigma_T$ ITL(Rcmds))/t | $(\Sigma_I \Sigma_L$ ITL(Rcmds))/t | $(\Sigma_T \Sigma_L$ ITL(Rcmds))/t | $(\Sigma_I \Sigma_T \Sigma_L$ ITL(Rcmds))/t |
| BLK | $\Sigma_I$ ITL(RB) | $\Sigma_T$ ITL(RB) | $\Sigma_L$ ITL(RB) | $\Sigma_I \Sigma_T$ ITL(RB) | $\Sigma_I \Sigma_L$ ITL(RB) | $\Sigma_T \Sigma_L$ ITL(RB) | |
| BLK/T | $(\Sigma_I$ ITL(RB))/t | $(\Sigma_T$ ITL(RB))/t | $(\Sigma_L$ ITL(RB))/t | $(\Sigma_I \Sigma_T$ ITL(RB))/t | $(\Sigma_I \Sigma_L$ ITL(RB))/t | $(\Sigma_T \Sigma_L$ ITL(RB))/t | |

FIG. 8C

| Data Type | $\Sigma_{Initiator(I)}$ | $\Sigma_{Target(T)}$ | $\Sigma_{LUN(L)}$ | $\Sigma_I \Sigma_T$ | $\Sigma_I \Sigma_L$ | $\Sigma_T \Sigma_L$ | $\Sigma_I \Sigma_T \Sigma_L$ |
|---|---|---|---|---|---|---|---|
| CMD | $\Sigma_I$ ITL(Wcmds) | $\Sigma_T$ ITL(Wcmds) | $\Sigma_L$ ITL(Wcmds) | $\Sigma_I \Sigma_T$ ITL(Wcmds) | $\Sigma_I \Sigma_L$ ITL(Wcmds) | $\Sigma_T \Sigma_L$ ITL(Wcmds) | $\Sigma_I \Sigma_T \Sigma_L$ ITL(Wcmds) |
| CMD/T | $(\Sigma_I$ ITL(Wcmds))/t | $(\Sigma_T$ ITL(Wcmds))/t | $(\Sigma_L$ ITL(Wcmds))/t | $(\Sigma_I \Sigma_T$ ITL(Wcmds))/t | $(\Sigma_I \Sigma_L$ ITL(Wcmds))/t | $(\Sigma_T \Sigma_L$ ITL(Wcmds))/t | $(\Sigma_I \Sigma_T \Sigma_L$ ITL(Wcmds))/t |
| BLK | $\Sigma_I$ ITL(WB) | $\Sigma_T$ ITL(WB) | $\Sigma_L$ ITL(WB) | $\Sigma_I \Sigma_T$ ITL(WB) | $\Sigma_I \Sigma_L$ ITL(WB) | $\Sigma_T \Sigma_L$ ITL(WB) | $\Sigma_I \Sigma_T \Sigma_L$ ITL(WB) |
| BLK/T | $(\Sigma_I$ ITL(WB))/t | $(\Sigma_T$ ITL(WB))/t | $(\Sigma_L$ ITL(WB))/t | $(\Sigma_I \Sigma_T$ ITL(WB))/t | $(\Sigma_I \Sigma_L$ ITL(WB))/t | $(\Sigma_T \Sigma_L$ ITL(WB))/t | $(\Sigma_I \Sigma_T \Sigma_L$ ITL(WB))/t |

METHOD AND APPARATUS FOR NETWORK STORAGE FLOW CONTROL

BACKGROUND OF THE INVENTION

Storage area networks or SANs facilitate sharing of storage devices with one or more different host server computer systems and applications. Fiber channel switches (FCS) connect host servers with storage devices creating a high speed switching fabric. Requests to access data pass over this switching fabric and onto the correct storage devices through logic built into the FCS devices. Host servers connected to the switching fabric can quickly and efficiently share blocks of data stored on the various storage devices connected to the switching fabric.

Storage devices can share their storage resources over the switching fabric using several different techniques. Port zoning shares the storage resources by limiting host server access to different port connections of the SAN. For example, port zoning can direct the higher frequency host servers to higher performance storage devices on the SAN while lower frequency host servers are given lower performance storage devices on the SAN. Storage resources can also be shared using storage controllers performing various types of storage virtualization. These virtualization controllers can make one or more physical disks appear as one or more logical units or LUNs. Some virtualization controllers are limited to virtualizing the same type of drive, drives from the same manufacturer, or drives with other common characteristics.

Unfortunately, accessing these shared storage devices can be difficult if one or more host servers use too much bandwidth over the switched fabric. Servers accessing their storage over the switched fabric more frequently may use a majority of the available bandwidth and leave little or no bandwidth resources for other host server devices. Even a host server given access to higher performance storage devices may experience poor performance because the bandwidth is in use by other host servers.

Current SAN and switching devices cannot adequately monitor and allocate bandwidth provided over the switched fabric. They do not carefully monitor bandwidth utilization over the switched fabric and thus cannot assure a host server or user that storage allocated on the SAN can be accessed consistently. This lack of control over the bandwidth allocation on the switched fabric makes it difficult to provide storage resources with a high degree of reliability.

Without bandwidth monitoring and allocation capabilities, it is also hard to charge for using bandwidth to access storage over the switched fabric. In a corporate setting, the information technology (IT) department cannot accurately charge-back for information technology costs on a departmental profit and loss basis. For example, a department with a small amount of SAN storage may access the storage more frequently and use a larger amount of bandwidth than other departments with larger amounts of storage that access the storage more infrequently. Similarly, Internet Service Providers (ISP) and other companies providing commercial storage resources cannot accurately charge their customers for storage costs. Essentially, this makes it difficult for commercial companies to pass along the proper costs to the customers using more bandwidth without penalizing those using less bandwidth over the switched fabric to access their storage resources.

SUMMARY OF THE INVENTION

One aspect of the present invention concerns a method of collecting reliable source of information. Collecting this information, the SAN includes identifying a data type transported on the storage network, selecting a port-storage identifier to measure the data type transported across the storage network, monitoring the port-storage identifier on the storage network for the data type and enumerating occurrences of the data type associated with the port-storage identifier while monitoring the port-storage identifier and the data type.

Another aspect of the present invention includes using the information collected over these ports to design a SAN. Initially, the SAN design includes collecting data associated with a port-storage identifier and transported over the storage network, analyzing the data associated with the port-storage identifier, developing a storage network architecture, and operating the storage network architecture in accordance with the data collected and associated with the port-storage identifier.

Yet another aspect of the invention includes defining a port-storage identifier and related parameters on a SAN used in flow control. Defining the port-storage identifier and related parameters for flow control includes identifying a port-storage identifier for collecting a data type, selecting a type of flow-control to perform on the storage network, associating the selected flow-control type with the port-storage identifier for monitoring the data type, and determining threshold levels for occurrences of the data type over the port-storage identifier.

In another aspect of the present invention, performing flow control on the SAN includes identifying information on a data type passing through a port-storage identifier on a storage network, comparing a threshold with the data type passing through according to the port-storage identifier, determining when the threshold associated with the data type has been exceeded in consideration of the information received, and queuing in response to the determination the data type scheduled to pass through one or more ports identified by the port-storage identifier of the storage network.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 8A provides a sample of some of the measured statistics collected for different data types according to a particular port-storage identifier;

FIG. 8B provides samples of derived statistics used when various data types are read according to different port-storage identifiers;

FIG. 8C is also a table of derived statistics used when various data types are written according to different port-storage identifiers.

Like reference numbers and designations in the various drawings indicate like elements.

DETAILED DESCRIPTION

Aspects of the present invention accurately measure data access, usage, and data flow over the fiber channel switch (FCS) fabric in a storage area network (SAN). Implementations of the present invention monitors commands, blocks, frames, and other data passing over the various ports used on the SAN to monitor use of the fabric for accessing the corresponding SAN storage. This information facilitates partitioning bandwidth over the fabric through flow-control and provides host servers with both immediate and long term needs on the SAN. In one implementation, these features are designed into the firmware of a virtual storage exchange (VSX) device designed by Confluence Networks, Incorporated of Milpitas Calif. (VSX is a trademark of Confluence Networks, Incorporated).

In one implementation, the VSX is embedded in the fabric of the SAN and appears as a target to the host server devices requesting storage from the SAN. The VSX can be configured into the fabric using the port zoning services from the fabric or, in an alternate implementation, can be physically cabled directly into the SAN architecture. In these or other implementations, data is monitored as it is transmitted over initiator ports (i.e., ports on the host server) through target ports (i.e., ports on the VSX device), and onto the storage ports used to access the various storage devices.

Data and control travels through ports on the initiator, ports on the target, and to the storage devices; a path identified using an ITL (initiator-target-LUN) triplet; this ITL triplet is more generally referred to as a port-storage identifier. By setting thresholds for data passing through the many port-storage identifier combinations, a flow-control method and apparatus of the present invention achieves better bandwidth usage over the switching fabric of a SAN and overall better usage of the SAN.

Figure 1:
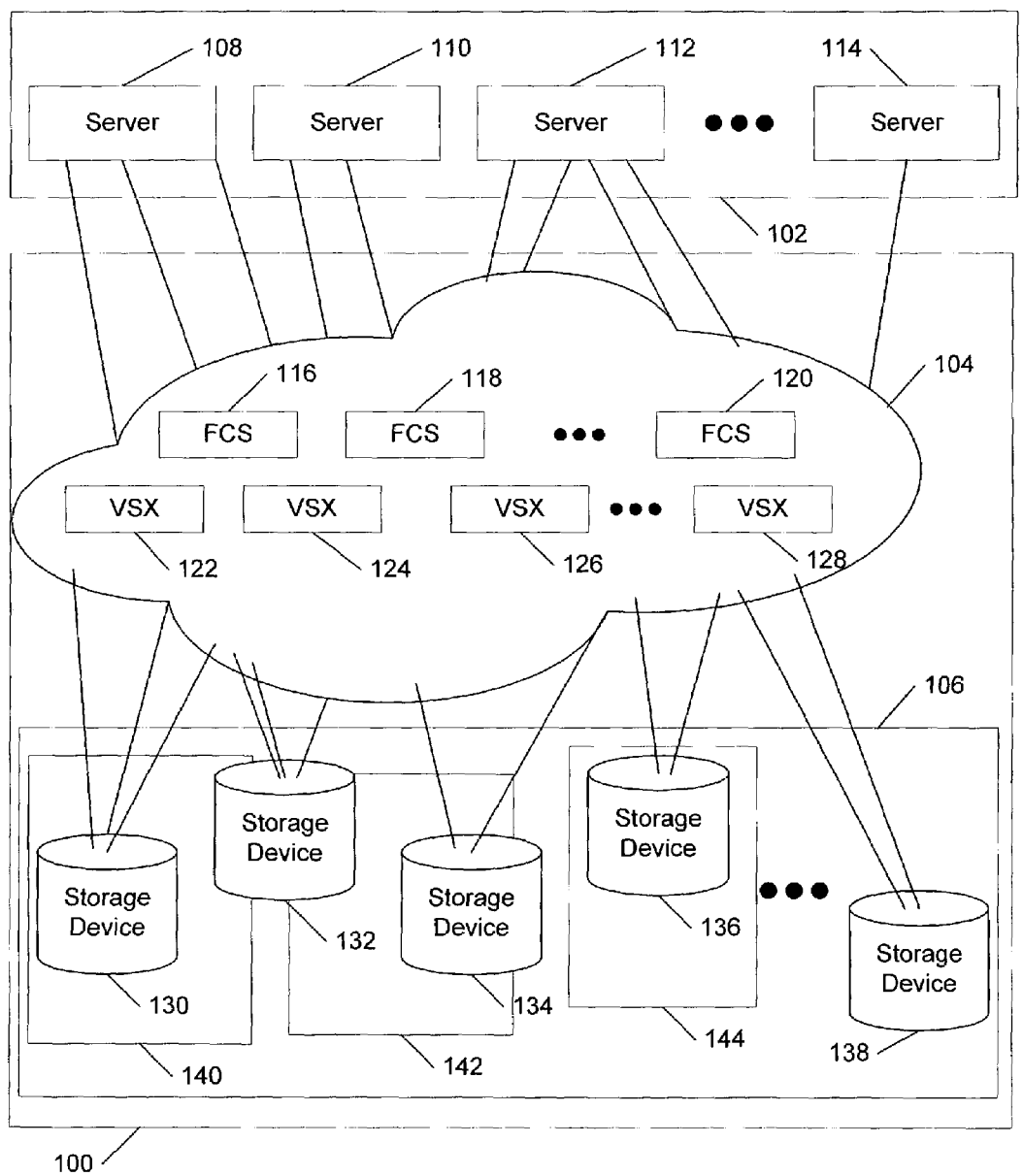
FIG. 1 is a block diagram of various server devices and a storage area network (SAN) implemented using a fiber channel switching fabric along with implementations of the present invention.

FIG. 1 is a block diagram of various server devices 102 and a storage area network 100 (SAN) implemented using a fiber channel switching fabric along with implementations of the present invention. Server devices 102 depicted in FIG. 1 access storage devices over SAN 100 using flow-control features provided by implementations of the present invention. In this example, the flow-control features of the present invention are embedded in a fabric 104 and storage devices 106 of SAN 100. SAN 100 provides a network infrastructure for the reliable access and rapid transportation of storage even when server devices 102 may be more remotely located.

Generally, the protocol used over fabric 104 includes five fiber channel levels: fiber channel physical media (FC-0), fiber channel encode and decode (FC-1), fiber channel framing and flow control (FC-2), fiber channel common servers (FC-3) and fiber channel upper level protocol (FC-4/ULP) mappings.

In one implementation, FC-0 layer specifies how light is transmitted over fiber and the corresponding transmitters and receivers in fabric 104 operate over different types of media. FC-1 layer encodes and decodes information in digital signals and includes error detection/correction. For example, data at the FC-1 layer transmitted uses 8b/10b encoding.

FC-2 layer provides framing and basic flow control using primitives transmitted from the FC-1 and delimited by a special character like the "K" character. These primitives used at FC-2 layer control state machines and corresponding arbitration, loop initialization and data-carrying frames while also controlling the flow of data by initiating transfers.

Distributed fabric services are provided using the FC-3 layer fiber channel common services layer. These distributed fabric services provided by FC-3 layer virtualizes resources and creates an illusion to server devices 102 that storage in storage devices 106 and other attached resources are a single resource available to one or more of server devices 102. A few of these distributed fabric services include a name server—providing addresses of devices attached to fabric 104 like storage devices 106, a time server—providing synchronization throughout resources attached to fabric 104, a login server—providing access control to fabric 104 and attached resources, a fabric/switch controller—providing state change notification to registered switches of changes to fabric 104 and a management server—providing information about fabric 104 and ability to manage the services and resources attached to fabric 104 from a central facility.

FC-4 layer provides compatibility with different protocols used in various storage devices. This layer enables legacy and other storage devices to take advantage of the increased speeds available through fabric 104. For example, the FC-4 layer provides upper layer mapping (ULP) to facilitate the translation between fiber channel and SCSI, Internet protocol (IP), Virtual Interface (VI), Intelligent Peripheral Interface (IPI), High-Performance Parallel Interface (HiPPI) and Fiber Distribute Data Interface (FDDI). Implementations of the invention work with the more common of these protocols compatible with the SCSI protocol and identified as parallel SCSI or SCSI-FCP however alternate implementations can be used with other protocols or combinations of protocols described previously at the FC-4 layer. Of course, the fiber channel levels described above can be used with one implementation of the present invention however alternate implementations of the present invention can be designed and configured to work with alternate protocols as well.

Here in FIG. 1, server devices 102 include server 108, server 110, and server 112 through server 114. These devices can be computer systems and devices attached to fabric 104 that utilize storage resources provided by storage devices 106. As previously described, Ports on server devices 102 are designated "initiator ports" in SAN 100 as they are used to seek out and initiate communication with a target port. In accordance with the present invention, VSX devices 122, 124, and 126 through 128 appear as target ports to ports on server devices 102. Fiber channel switching (FCS) devices 116, and 118 through 120 provide switching functionality allowing components attached to and within fabric 104 to readily communicate with each other over one or more ports. As will be described in further detail, VSX devices 122, 124, 126 through 128 monitor the traffic flowing over fabric 104 and use flow control to check the usage of bandwidth and other related resources.

In the example implementation in FIG. 1, storage devices 106 depicted by storage device 130, 132, 134, 136 through 138 include a combination of one or more storage device technologies including redundant array of independent/inexpensive disks (RAID), just a bunch of disks (JBOD), tape and other storage mediums. Storage devices connected to a SAN are sometimes referred to as SAN storage.

These various storage devices and technologies can be grouped together in "Storage pools" based on upon shared traits, performance characteristics, reliability, allocation policies, and quality of service (QOS). Virtualization allows the storage devices in these storage pools to be combined together or sliced into smaller pieces and made accessible over fabric 104 as virtual storage. Storage virtualization provides the illusion to server devices 102 they are accessing a single LUN rather than a pool of heterogeneous storage devices.

Free pools represent the available storage from the storage pool before allocation. A system administrator or software agent divides the storage into logical portions when deciding how to partition the free pools into allocated pools of storage. For example, FIG. 1 illustrates a virtual logical unit (VLUN) 140 using storage device 130 and a portion of storage device 132 and a VLUN 142 using the remaining portion of storage device 132 and a portion of storage device 134. VLUN or Virtual LUN is storage carved from a virtualized pool of storage that the VSX devices export to an initiator port. For example, the VLUN is can be created by concatenating multiple physical LUNs or can use only a single slice cut from a single LUN of RAIDs or JBODs. LUN 144 represents a native LUN that maps directly to storage device 136 in this example however many other combinations of VLUN and LUN can be created from storage devices 106. Storage device 138 remains in the free pool in this example implementation.

Server devices 102 access blocks of data from storage devices 106 using switching and data sharing functionality provided through fabric 104. These blocks of data can come from one VLUN or a combination of VLUNs and LUNs in an allocated pool of storage. Further, fabric 104 also includes a port zoning feature to control access to the ports associated with VLUNs and LUNS in storage devices 106 and the ports associated with servers in servers 102. While not typical, port zoning can also be used to control port access between like storage devices 106 or between like servers 102. For example, fabric 104 facilitates server 108 accessing server 110 if allowed through the port zoning feature.

Port zoning is of particular interest for controlling access between server devices 102 and storage devices 106 using VSX 122, VSX 124 and VSX 126 through VSX 128. This relationship is represented logically by the block diagram in FIG. 2 having storage devices 202 and SAN 200. In this example, ports to server devices 202 and storage devices are partitioned using port zoning and configured to pass data through VSX 222, VSX 224 and VSX 226 through VSX 228. This ensures that communication between any server devices 202 and storage devices passes through VSX devices for monitoring and flow-control in accordance with the present invention.

Figure 2:
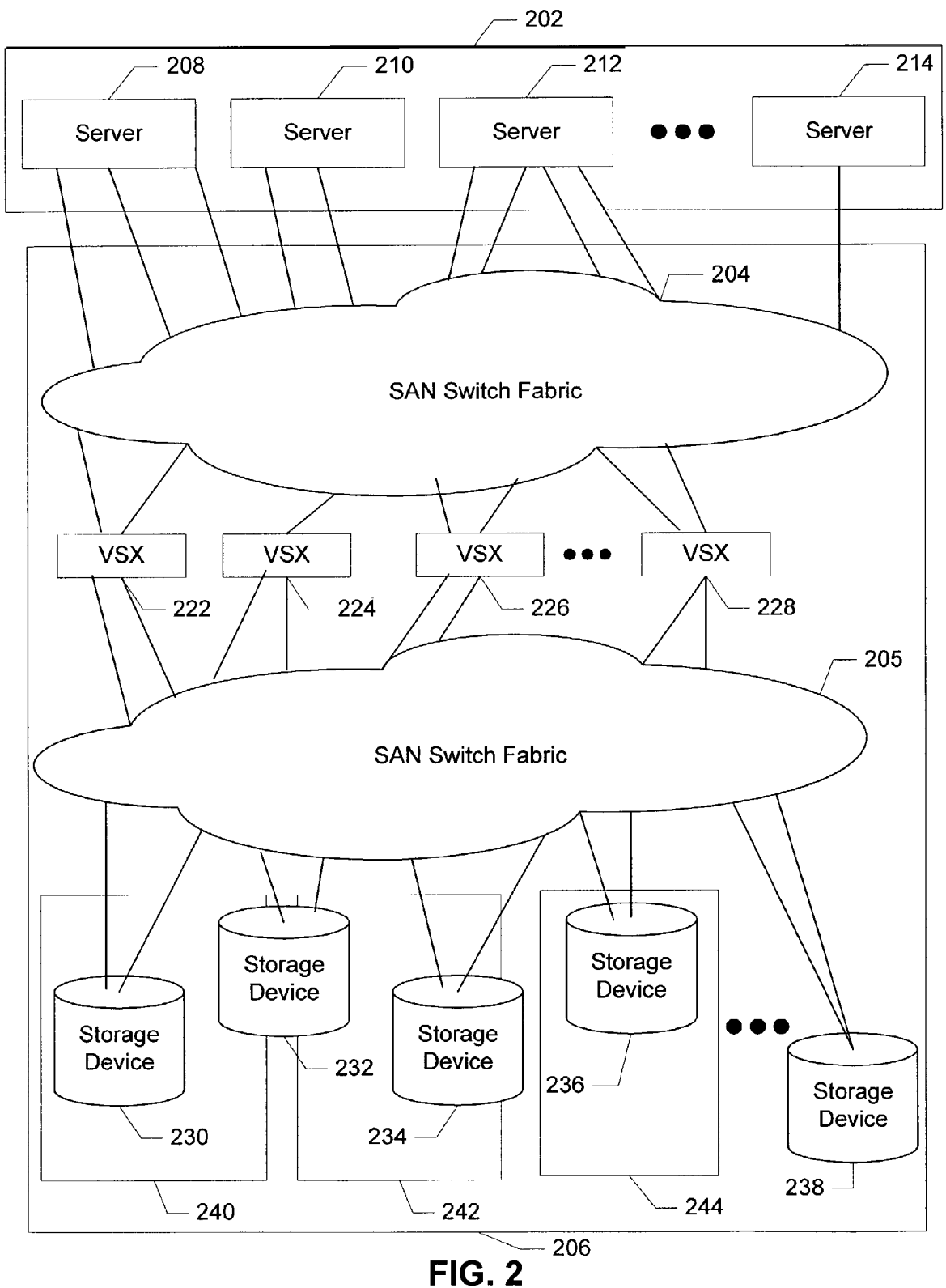
FIG. 2 is a block diagram of the logical relationship between server devices, storage devices, and target devices in accordance with one implementation of the present invention.

VSX devices in FIG. 2 appear as storage controllers to server device 208, server device 210, and server device 212 through server device 214. Each port on server device 208, server device 210, server device 212 through server device 214 acts as an initiator port. Corresponding ports on VSX 222, VSX 224 and VSX 226 through VSX 228 are target ports. Collectively, storage device 230, storage device 232, storage device 234 and storage device 236 act as VLUN 240, VLUN 242 and LUN 244. The separation the VSX devices provide between server devices 202 and storage devices logically makes a SAN switch fabric 204 and a separate SAN switch fabric 205 pass data through VSX 222, VSX 224 and VSX 226 through VSX 228.

Using SCSI protocol combatable taxonomy, the relationships portrayed in FIG. 2 are described using one or more Initiator-Target-LUN (ITL) triplets. As previously described, the combination is more generally referred herein as a port-storage identifier to describe the flow of information from the host servers to the storage devices. For example, a VSX exporting a LUN for a particular initiator-target pair creates an ITL binding and logical pathway between an initiating server device and the VLUN or LUN storage device. Fabric 204 and fabric 205 provides the switching necessary for these particular port-storage identifiers arranging the desired relationships among one or more ports on server devices, one or more ports on various VSX devices and one or more ports on LUNs or VLUNs and their underlying storage devices.

Figure 3:
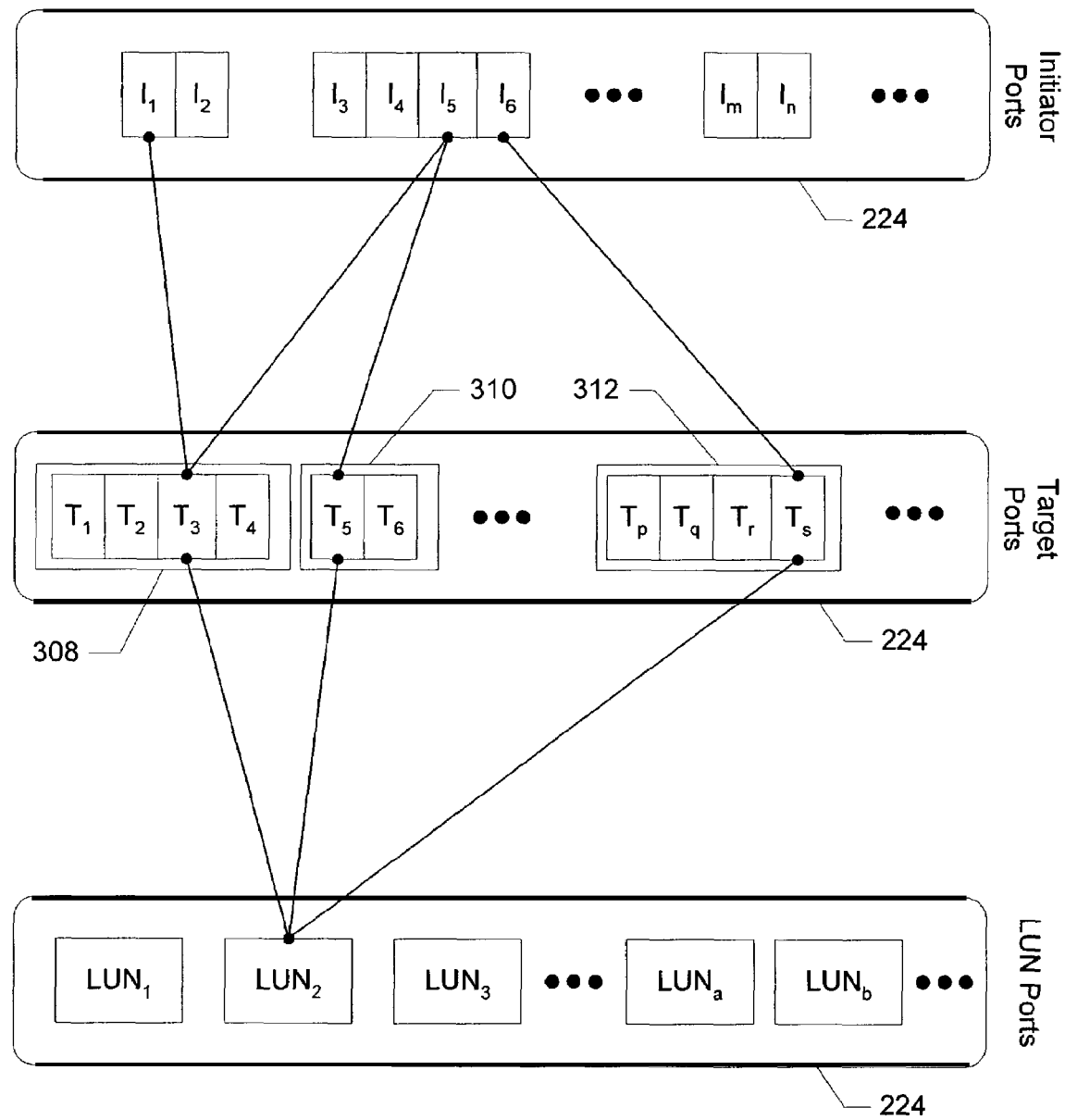
FIG. 3 exemplifies the relationship between initiator ports, target ports and storage devices in a port-storage identifier and as used in accordance with aspects of the present invention.

FIG. 3 exemplifies the relationship between initiator ports, target ports and storage devices according to a port-storage identifier and as used in accordance with aspects of the present invention. Initiator ports range from $I_1$ to $I_6$ and up to $I_m$ and $I_n$; target ports range from $T_1$ to $T_6$ and up to $T_p$ to $T_s$ and LUNs or VLUNs range from $LUN_1$ to $LUN_3$ and up to $LUN_a$ through $LUN_b$.

In one implementation, the initiator ports are associated with the ports on server devices, the target ports are associated with ports on the VSX devices and the LUN or VLUN are associated with ports on the storage devices in one or more storage pools. Implementations of the present invention configure the VSX devices to provide specific initiator ports access to one or more LUNs or VLUNs. In addition to directing access to certain ports on the LUN or VLUNs, VSX devices also provide redundant paths to the LUNs or VLUNs for high-availability and redundant cross-connects to storage. As will be described later herein, logic in the VSX devices designed in accordance with implementations of the present invention actively monitor the various ports reporting data traffic, providing flow control, statistical information, and many other features important to the design, implementation and operation of a SAN.

For example, LUN masking is used in the example in FIG. 3 to establish the various port-storage identifiers by restricting the VSX to exporting certain LUNs to specified initiators as specified by the user. In this case, LUN2 is exported through target ports $T_3$, $T_5$ and $T_S$ belonging to VSX device 308, VSX device 310 and VSX device 312 respectively. The target ports $T_3$, $T_5$ and $T_S$ associated with these VSX devices in turn export $LUN_2$ onto initiator ports $I_1$, $I_5$, and $I_6$ as illustrated in the diagram. Statistical data can be gathered from one port, two ports, or a combination of all three ports corresponding to the port-storage identifiers. Here, the port-storage identifiers describing the relationships depicted in FIG. 3 include $I_1T_3L_2$, $I_5T_3L_2$, $I_5T_5L_2$ and $I_6T_5L_2$.

Information collected by the VSX devices at the various ports within a SAN is used for flow-control functionality in accordance with implementations of the present invention. The flow-control can be used in a variety of ways including: load-balancing, improving SAN design, implementing, and operating the SAN. In one application of the present invention, the information and statistics can be used to provide a required Quality of Service (QoS) that delivers storage over a fabric based on user requirements and/or service level agreements (SLAs). In addition to flow-control, information collected over ports and storage devices can also be useful within a SAN to determine failing ports and troubleshooting outages.

Figure 4:
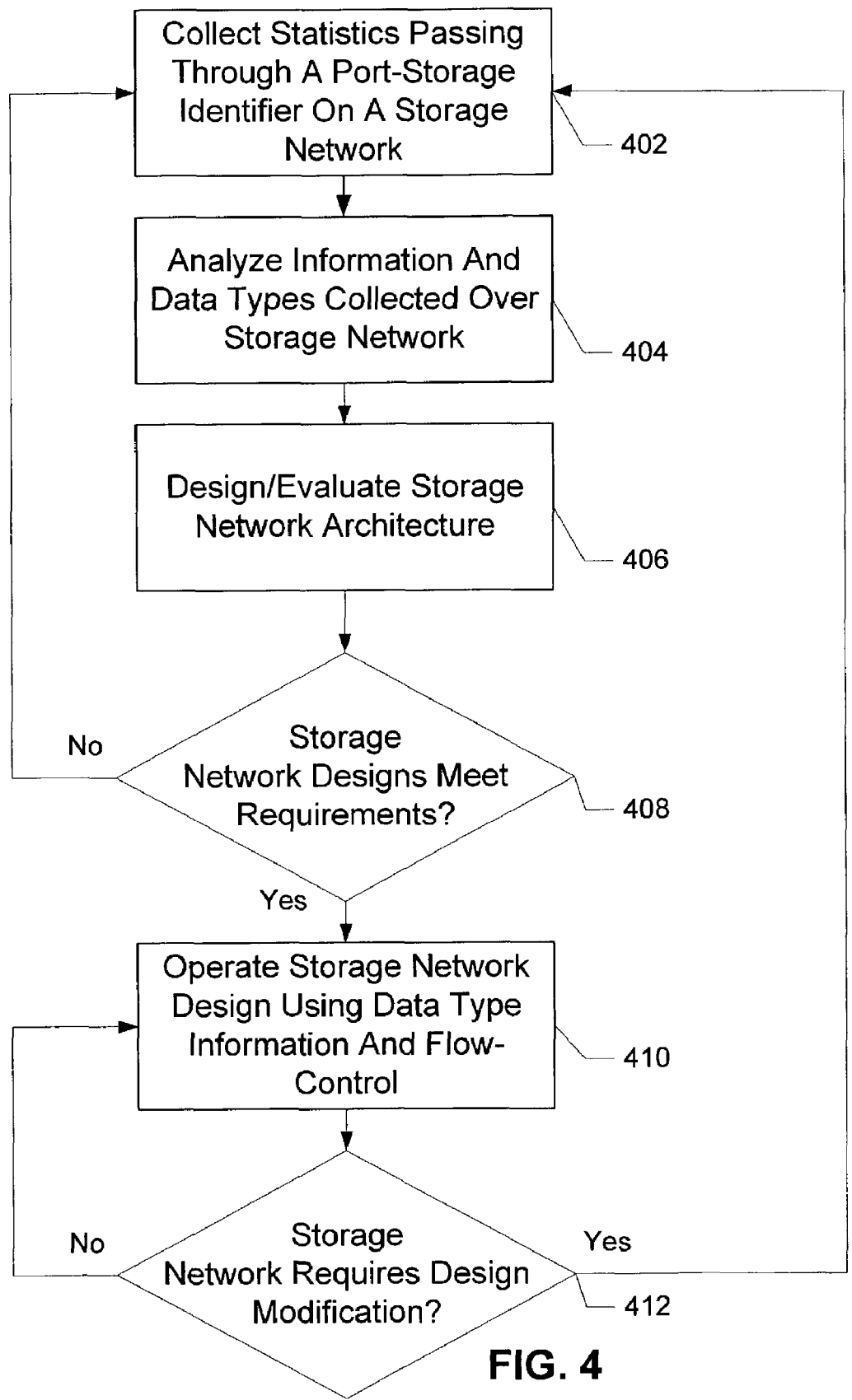
FIG. 4 is a flowchart diagram depicting the design of a SAN storage system using flow control information provided in accordance with one aspect of the present invention.

The flowchart diagram depicted in FIG. 4 provides the operations for using flow-control in the design and operation of a SAN in accordance with one aspect of the present invention. The operations in FIG. 4 analyze information collected from traffic carried over initiator ports, target ports, and storage devices on the SAN. Flow control of the present invention uses the information collected to allocate and monitor bandwidth usage over the fabric. Information collected includes measured statistics corresponding to the data and traffic passing over different port-identifiers (i.e., ITL combinations). Further information collected includes derived statistics created by aggregating the measured statistics gathered from different port and storage combinations. For example, a derived statistic can measure the number of frames being read from a particular LUN over multiple different initiator ports. Details on the measured statistics and derived statistics are described in further detail later herein.

Initially, designing and operating the SAN begins by collecting statistics passing through a port-storage identifier on a storage network (402). These statistics include measured statistics, derived statistics, and other types of calculations using information collected along the various ports and storage devices. The statistics are generally calculated for one or more data types that pass through the VSX device. In one implementation, these data types include organizational structures like bytes, blocks and frames for transmitting data over the storage network; the data types also include read and write commands compatible with various protocols. For example, the Small Computer System Interface (SCSI) protocol is one useful storage protocol used to read and write the bytes, blocks, frames, and other organizational data structures for storing and retrieving information on a SCSI compatible storage device or system.

The port-storage identifier determines the ports and storage device that the data types pass through on the SAN. For example, a port-storage identifier generally refers to a specific ITL triplet defining a path between a server device port (i.e., an initiator port), a VSX device port (i.e., a target port), and a storage device (i.e., a LUN) or multiple paths defined by several different port-storage identifier combinations along the SAN. In an alternate implementation, a port-storage identifier can reference a combination of several initiator ports associated with a set of server devices that pass data through one target port on a particular VSX device. Alternate implementations may also include many other combinations of ports and/or storage devices.

Once collected, the information and corresponding data types are analyzed to determine data access patterns and bandwidth requirements over the storage network (404). For example, a port-storage identifier having a large amount data or command traffic may signal that the path associated with the port-storage identifier is carrying a peak amount of information. Alternatively, an individual initiator port, target port or storage device processing large amounts of traffic may indicate that the port or storage device is operating at maximum capacity; to resolve this may require increasing bandwidth capabilities. These and other types of analysis can be performed and used to draw other conclusions about a particular SAN design.

The analysis can then be used to either design or evaluate the SAN architecture (406). A portion of this design process includes defining the port-storage identifiers to monitor data traffic between one or more server devices (i.e., initiators) and one or more VLUNs/LUNs (i.e., LUNS) using one or more of the target ports on one or more VSX devices (i.e., targets).

Based on the data collection, research, and analysis, the SAN architecture is operated and then tested to determine if it meets the network design requirements (408). Flow-control is performed over ports on the VSXs using implementations of the present invention to ensure bandwidth is distributed properly and as planned. However, if storage network design requirements are still not met even with flow-control, more data collection and processing is performed (402) and the storage network design may be changed. Alternatively, if the storage network is operates and is designed properly, it is implemented and operated (410) without further analysis. The storage network design continues to be used over time until the storage network requires architectural modification (412) due to a change in requirements or usage. When design changes are required, the data collection, analysis and design process may be performed again (402).

Figure 5:
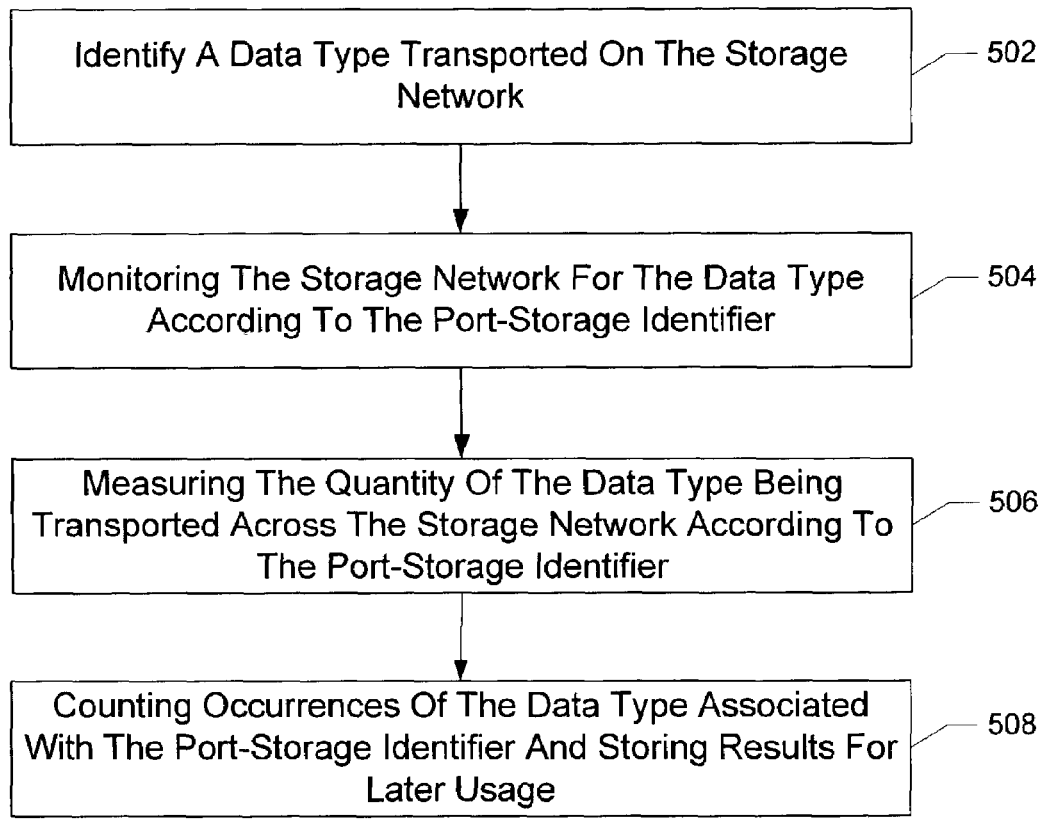
FIG. 5 depicts the operations used to collect information from ports and storage devices on the storage network.

FIG. 5 depicts the operations used to collect information through storage controller ports to storage devices on the storage network. The information collected assists in performing flow-control of bandwidth and other resources of the switched fabric.

Data collecting generally begins by identifying one or more data types to collect on the storage network (502). The particular data types used by the different implementations of the invention depend on the type of statistics or analysis being performed. For example, a VSX device designed in accordance with the present invention identifies commands, bytes, blocks or frames of data passing over the fabric and storage devices by sampling data and comparing the samples with known header and other identification information.

In addition, the VSX device monitors a number of ports and storage devices selected according to the port-storage identifier (504). The port-storage identifier can be any combination of initiator ports, target ports, or LUN/VLUN storage devices. The monitoring requires inspecting the data passing through the ports and storage devices associated with the storage network.

Measurements are made on the quantity of the data type being transported across a port-storage identifier on the storage network (506). Because the data types may vary, conversions may be required to properly record transport of the data type across the port-storage identifiers and onto storage devices. For example, conversions may be required between frame sizes and block sizes being transported with different protocols.

The converted measurements are used to enumerate occurrences of the data type associated with the port-storage identifiers while monitoring locations identified by the port-storage identifier (508). Data is collected by recording the passing of the data type through various ports and storage devices; the counts are stored in registers, cache, or other storage areas used by implementations of the present invention. The counts made of the data types associated with the port-storage identifier are used to perform flow control as further described later herein.

Figure 6:
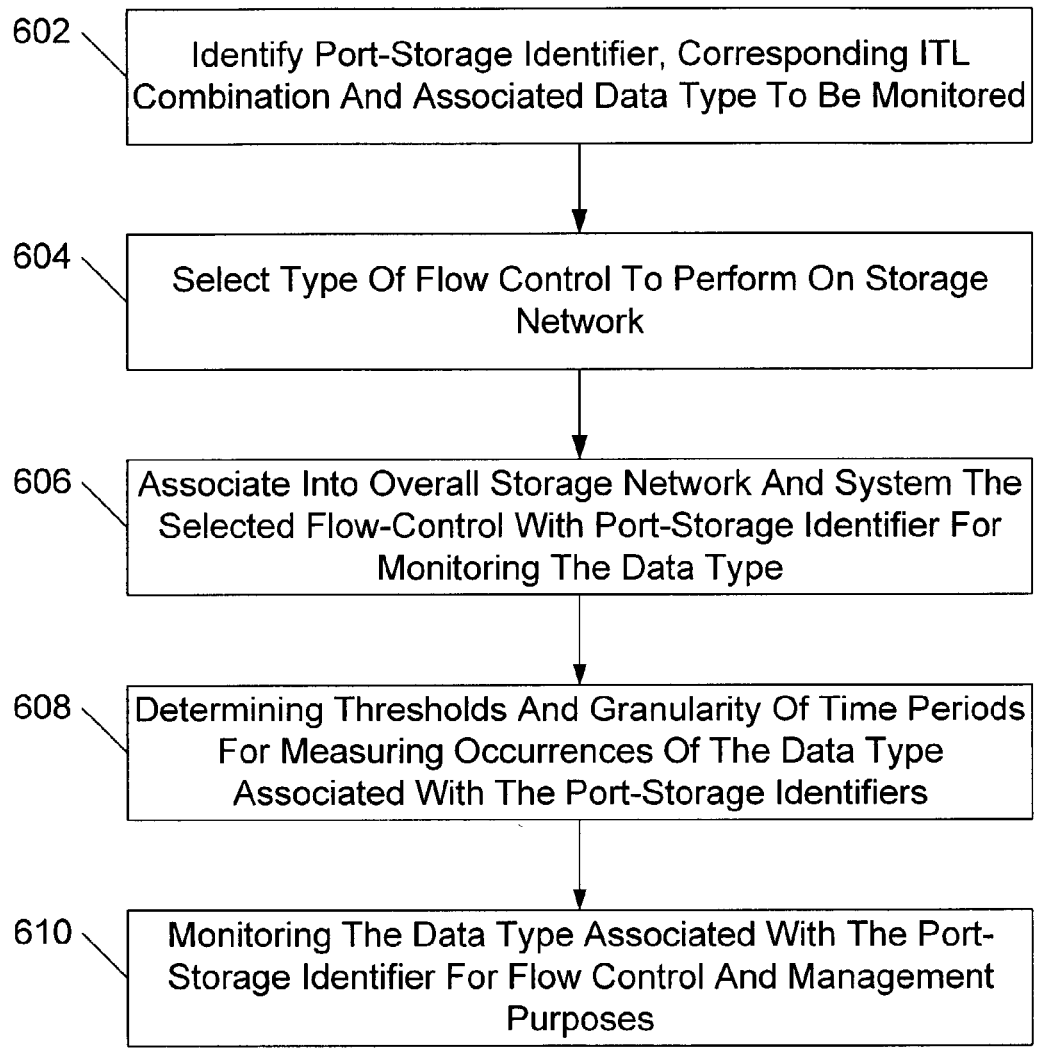
FIG. 6 depicts a flow chart of the operations for setting up flow control using one implementation of the present invention.

FIG. 6 depicts a flow chart of the operations for setting up flow control using one implementation of the present invention. Flow control monitors and limits traffic carrying data and commands over the various ports and storage devices; this facilitates providing guaranteed bandwidth over the SAN and access to the storage devices in the SAN. The setup operations are typically performed by an administrator or operator responsible for maintaining and modifying the SAN to match usage needs. For example, the system administrator could setup these flow control parameters using a graphical user interface (GUI) or command-line interface (CLI) that communicates with a VSX device in the SAN. Alternatively, these operations could be performed automatically by a software agent or by SAN management tools that automatically or semi-automatically configure ITL ports in the SAN to match a port-storage identifier, storage usage requirements, data access requirements, and the capabilities of the fiber channel switching devices and attached storage devices.

Initially, the administrator or agent identifies a port-storage identifier and the corresponding initiator-target-LUN (ITL) combination along with the associated data type to be monitored (602). Determining the number of ports used in the ITL binding depends on the goals in collecting information on the SAN and is discretionary. For example, the ITL binding definition can include one initiator port or multiple initiator ports (i.e., ports on a server device) for collecting data passing through a common target port (i.e., a port on a VSX device). Alternatively, the ITL binding definition can include all the target ports (i.e., multiple ports on one or more VSX devices) passing information to one or more storage devices. Further details on defining ITL binding definitions are described in further detail later herein.

Additionally, the administrator or agent may also be required to specify the data type monitored over the one or more ports and storage devices depending on the type of flow control to be performed. Data types include organizational structures like bytes, blocks and frames for transmitting data over the SAN or can further include storage protocol commands. For example, the administrator or agent can designate monitoring read commands for blocks of data but not monitoring write commands for blocks of data or vice-versa. In one implementation, the storage protocol commands are compatible with one or more versions of the Small Computer Systems Interface (SCSI) protocol used in SANs and the storage devices. Alternate protocols used to communicate with storage devices are also contemplated and can be used.

Next, the administrator or agent selects a type of flow control to perform (604). In one implementation, the type of flow control corresponds to the data type being collected over the one or more ports or storage devices. For example, the agent or administrator generally performs command flow-control to limit the amount of commands being sent over certain ports, data flow-control to limit the amount of data transmitted over the ports, frame flow-control to limit the number of frames of data transmitted over certain ports and associates these limitations with the ITL binding provided. Selecting the type of flow control also involves measuring statistics and derived statistics associated with the particular port-storage identifier and data type. The measured statistics and derived statistics are described in further detail later herein and include measuring: commands per unit time, data blocks per unit time, frames passing per unit time across various ports and storage devices.

Setting up flow control further involves associating the selected flow control with port-storage identifiers and data types in the overall system (606). In one implementation, this involves populating a table or database that associates a particular port-storage identifier with filters capable of identifying the data types passing through the VSX device, other locations on the SAN, and storage devices. Once a data type is identified using the port-storage identifier, the filter or filters enumerate the occurrence of the data type and pass the information to other layers of the VSX device. The VSX uses this information to perform statistical calculations and flow-control operations in accordance with implementations of the present invention.

Next, the administrator or agent determines thresholds and granularity of time periods for measuring occurrences of the data type over the port-storage identifiers (608). Maximum thresholds are generally set to limit the amount of data types transmitted over a specified port-storage identifier. Alternatively, minimum thresholds can also be set to identify underutilized ports not receiving a minimum amount of data or usage. In one implementation, the administrator or agent sets parameters in the VSX device to generate an alert or interrupt when these maximum or minimum thresholds are met and to take certain actions in response. Thresholds limitations for transmission of commands, blocks, frames, and other information over certain port-storage identifiers provide a direct method of performing flow control on the SAN. Setting thresholds in accordance with the present invention allows multiple parties to share a storage network with guaranteed allocations of bandwidth, storage, and other resources during a given time interval.

Specific additional thresholds can be set to monitor available bandwidth on the storage network. For example, a minimum bandwidth threshold is set to ensure that a given transaction has the requisite bandwidth to perform a given function at all times with respect to a port-storage identifier. Similarly, setting an available bandwidth threshold ensures that the remaining bandwidth in the system stays above a minimum amount in the event another user or application suddenly needs bandwidth to access storage and data on the storage network.

Timing intervals can also be set to determine the sampling frequency. The timing interval affects the flow control in several ways including the processing load and accuracy of calculations. For example, a smaller granularity of time corresponds to sampling information over the port-storage identifier more frequently and with commensurately larger processing load and higher accuracy. Conversely, increasing the time period for sampling information over the port-storage identifier has reduced processing requirements but also may result in less accurate measurements overall.

Once the thresholds, timing, other parameters are set, the system then monitors the data types and port-storage identifiers for flow control and management purposes (610). The monitoring continues until one or more thresholds are met and further processing is required.

Figure 7:
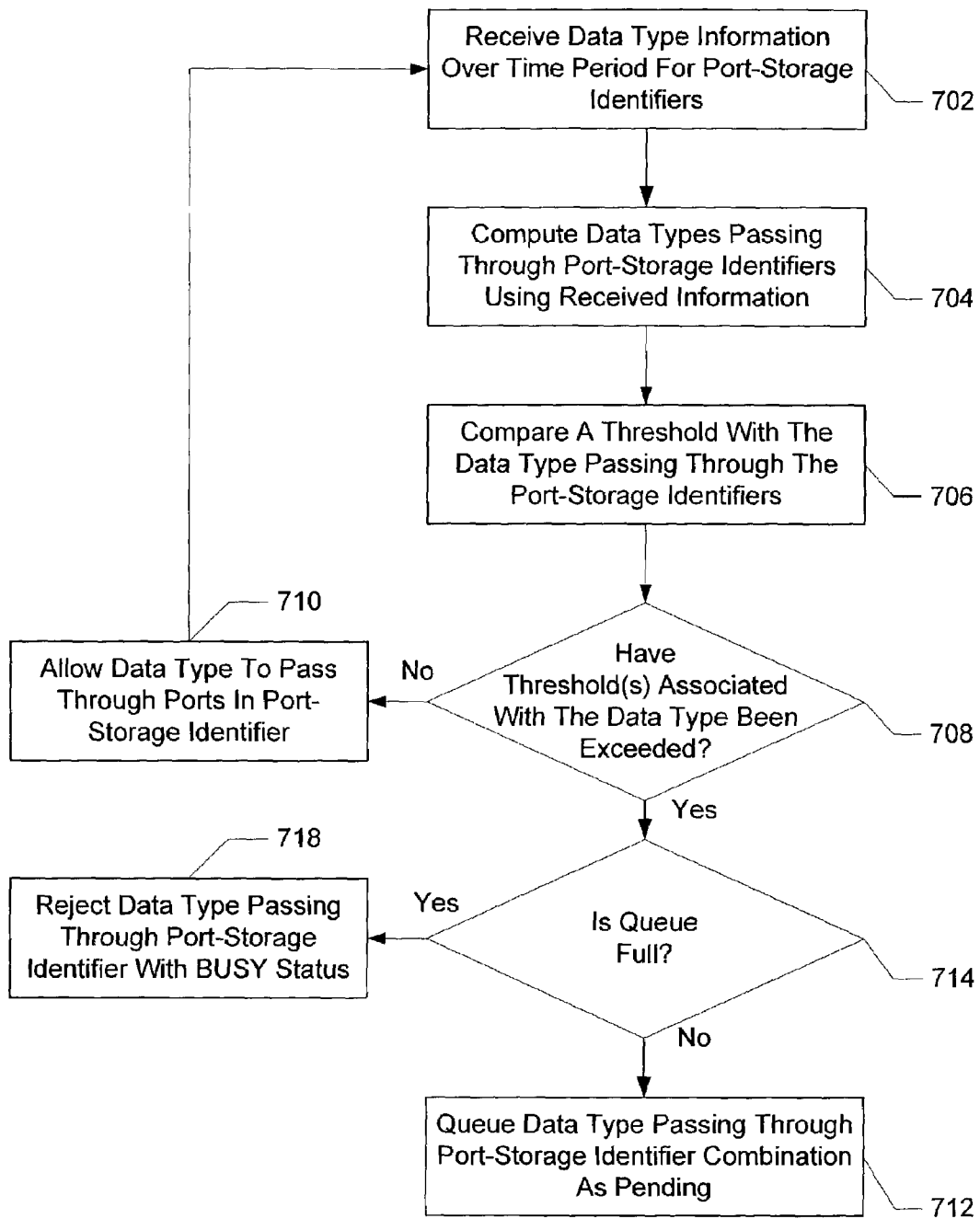
FIG. 7 provides a flow chart diagram of the operations used to perform flow control in one implementation of the present invention.

FIG. 7 provides a flow chart diagram of the operations used to perform flow control in one implementation of the present invention. These operations are typically performed when the thresholds and other settings previously described with respect to FIG. 6 are met. Flow control processing receives data type information for one or more port-storage identifiers (702). The data type information is collected using a variety of filters and other methods for processing a datastream of information passing through ports and storage devices associated with the SAN, VSX device, and other components.

The flow control processing computes an accumulation of the data types passing through the port-storage identifiers (704). In one implementation, the flow control references a table with the port-storage identifiers and corresponding data types for determining which port-storage identifiers and data types to process. Temporary storage holds this information for subsequent processing and determinations. The flow control processing then compares the aggregate number of data types passing through the port-storage identifiers with threshold values set for the determinations (706). The threshold values are typically setup in advance as previously described in conjunction with FIG. 6 and stored in a table, database, or cache associated with the SAN.

If the flow control processing comparison determines that the thresholds for one or more data types and port-storage identifiers have not been exceeded (708), the data type is allowed to pass through ports and storage devices according to the port-storage identifier and continue processing (710). Alternatively, if the threshold limits have been exceeded, the request to pass the information may be queued for subsequent processing (714). Eventually, these data type requests passing through the port-storage identifier are identified as pending and moved from the queue back for fulfillment using a round-robin or other queue scheduling technique (712). In general, queued requests are delayed until the next period of measurement when these requests are allowed on a First In First Out basis until they are all eventually fulfilled. Once the queue is not empty, new data type request will be put on the queue. However, if the threshold for the data type is exceeded (708) and the queue and/or VSX devices is full (714), the data type attempting to pass through the port-storage identifier is rejected and a message is sent back to the initiator or server device indicating a BUSY status. An initiator will retry the busied operation later.

FIG. 8A provides a sample of some of the measured statistics collected for different data types according to a particular port-storage identifier; in this case the port-storage identifiers have an initiator port, target port, and a corresponding storage device. This chart provides the nomenclature representing a sample of the measured statistics made for various data types over port-storage identifiers on the SAN. These measured statistics include read and write operations for commands, data blocks, and data frames made over the SAN. They also include measuring the occurrence of these values during a time period. For example, in one implementation of the present invention ITL (RB/t) corresponds to measuring the frames being read per unit time across a specific ITL port-storage identifier on the SAN. ITL (Wcmds)/t corresponds to a measurement of the number of write command frames being written across a specific ITL port-storage identifier and ITL (RF) corresponds to a number of frames being transmitted across the same. Other data types are also represented in FIG. 8A and used in various implementations of the present invention.

FIG. 8B provides samples of derived statistics used when various data types are read according to different port-storage identifiers. These derived statistics require further calculations and processing based on the measured statistics in FIG. 8A. Unlike 8A, these derived statistics can be calculated based upon one or more initiator ports, one or more target ports and one or more storage devices. In this example, the activity for particular data types and port-storage identifiers are summed over the various combinations and provided for measurement and comparison with threshold values used with flow control. For example, $\Sigma_I \Sigma_L$ indicates the flow control processing needs to enumerate the passing of specified data types through a specific target (i.e., a port on a VSX device) from any number of initiator ports and directed to any number of storage devices. This can be collected for various data types including: commands, blocks, frames or even bytes of information. Further, the rates of these data types passing over the ports and storage devices can also be determined. For example, commands/time unit, blocks/time unit, frames/time unit (not shown) or even bytes/time unit (not shown) can be measured FIG. 8C is also a table of derived statistics used when various data types are written according to different port-storage identifiers. These derived statistics in FIG. 8C provide similar information to FIG. 8B except the nomenclature identifies the data types and port-storage identifiers as they are written, rather than read, over the ports and storage devices.

Figure 9:
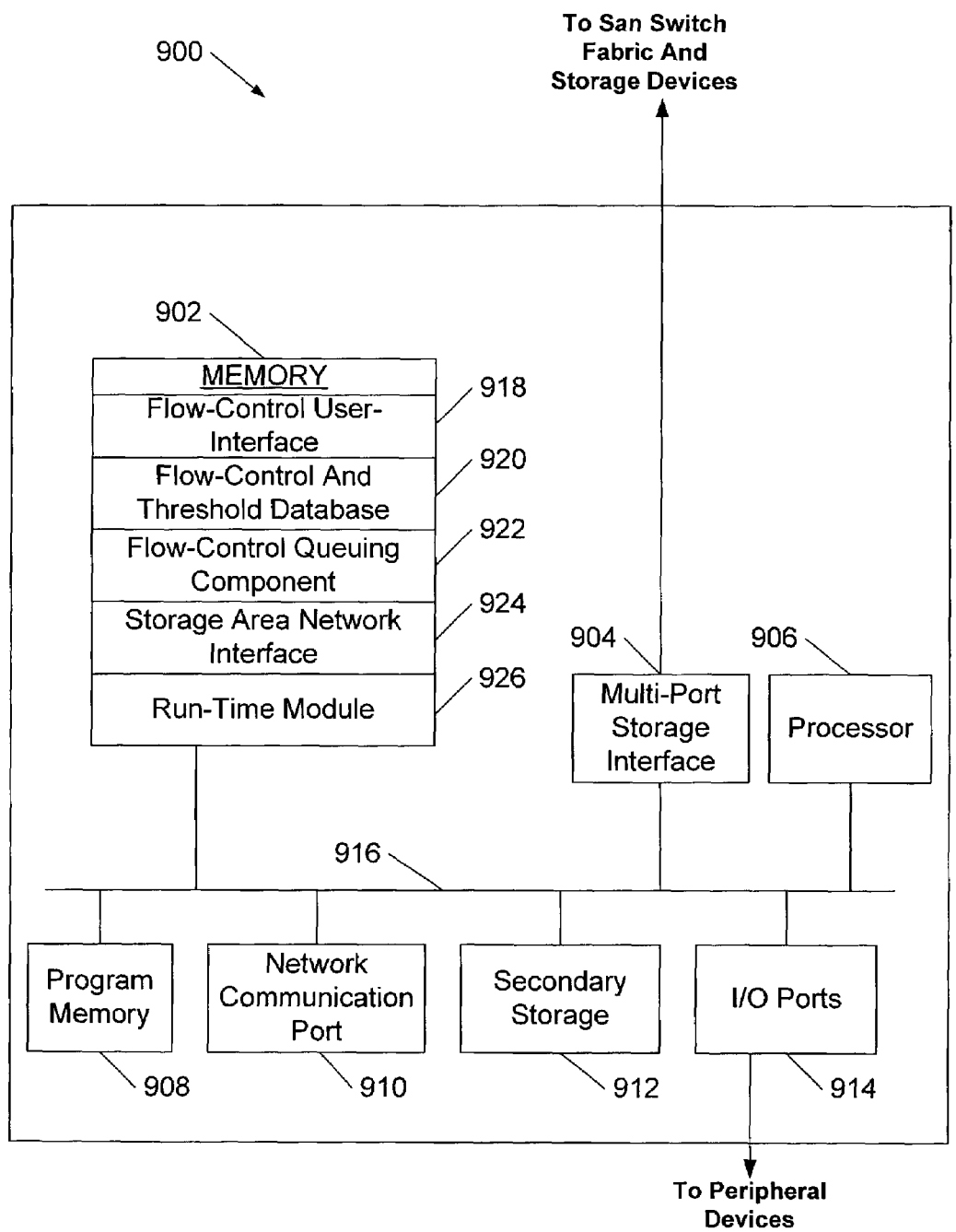
FIG. 9 provides one implementation of the present invention as it would be implemented in a computer device or system.

FIG. 9 provides one implementation of the present invention as it would be implemented in a computer device or system. In this example, system 900 includes a memory 902, typically random access memory (RAM), a multiport storage interface driver 904, a processor 906, a program memory 908 (for example, a writable read-only memory (ROM) such as a flash ROM), a network communication port 910 as an alternate communication path, a secondary storage 912, and I/O ports 914 operatively coupled together over bus 916. The system 900 can be preprogrammed, in ROM, for example using a microcode or it can be programmed (and reprogrammed) by loading a program from another source (for example, from a floppy disk, a CD-ROM, or another computer) and preferably operates using real-time operating constraints.

Memory 902 includes various components useful in implementing aspects of the present invention. These components include a flow control user interface 918, a flow control and threshold database 920, a flow control queuing component 922, and a storage area network interface 924 managed using a run-time module 926 which is typically a real-time operating system.

Flow control user interface 918 can be a GUI or CLI for programming the flow control data types and port combinations into the VSX device or other devices on the SAN. This interface can also be used for setting threshold levels and parameters associated with the aggregation of information and queuing of requests made through one or more ports on components within the SAN. These threshold levels, parameters, port-storage identifiers, and other information is stored in flow control and threshold database 920; if a database is not available, this information can also be stored in one or more tables of information or similar storage areas. Flow control queuing component 922 serves to queue up requests on the SAN that exceed threshold levels for the particular data types and port-storage identifiers. To maintain compatibility with the SAN, storage area network interface 924 provides an interface between aspects of the present invention and other storage area network components on the SAN. Because run-time module 926 is a real time operating system, responsiveness and processing of information for the present invention is initiated quickly.

Multiport storage interface 904 represents the multiple ports a device implements for transmitting data over a SAN. As previously described, multiple ports on the SAN are used to provide redundant backup and high-availability as well as provide more paths for passing data over the storage network when the ports are fully operational.

Secondary storage 912 is suitable for storing executable computer programs, including programs embodying the present invention, and data including buffers, cache space, and/or temporary storage space as needed to implement aspects of the present invention.

Input/output (I/O) ports 914 are coupled to system 900 through bus 916. Input/output ports 914 facilitate the receipt and transmission of data (e.g., text, images, videos, and animations) in analog or digital form over communication links such as a serial link, local area network, wireless link, and parallel link. These input/output (I/O) ports also facilitate communication with a wide variety of peripheral devices including keyboards, pointing devices (mouse, touchpad and touchscreen) and printers. Alternatively, separate connections (separate buses) can be used to interface with these peripheral devices using a combination of Small Computer Systems Interface (SCSI), Universal Serial Bus (USB), IEEE 1394/Firewire, Personal Computer Memory Card International Association (PCMCIA) or any other protocol suitable for interfacing with the peripheral device being attached to system 504.

In general, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, the processor receives instructions and data from a read-only memory and/or a random access memory. Also, a computer will include one or more secondary storage or mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A method of collecting information related to the operation of a storage network, comprising: identifying a data type transported on the storage network and used in analyzing data carried over the storage network; selecting a port-storage identifier that references a particular combination of at least one initiator port from a server device and at least one target port from a virtual storage exchange device that transports data through the target port associated with the virtual storage exchange device and onto each of the individual one or more storage devices in the storage network and is used to measure the data type transported across the storage network through a path described by the port-storage identifier; monitoring the port-storage identifier on the storage network for the data type to associate the data type with the path described by the port-storage identifier; and enumerating occurrences of the data type associated with the port-storage identifier while monitoring the port-storage identifier and the data type to determine how data is carried over the storage network, wherein the port-storage identifier includes a combination of one or more initiator ports, one or more target ports and one or more storage devices.

2. The method of claim 1 wherein identifying the data type further comprises:
analyzing a datastream carried over the storage network;
receiving organizational structures for grouping information and protocol commands for sending the organization structures in the datastream over the storage network; and
selecting the data type from a set of data types including one or more organization structures and one or more protocol commands.

3. The method of claim 2 wherein the organizational structures are selected from a set including, frames, blocks and byte data.

4. The method of claim 2 wherein the organizational structures are read or written over the storage network.

5. The method of claim 2 wherein the protocol commands includes a read command and a write command.

6. The method of claim 5 wherein the protocol commands are compatible with one or more versions of Small Computer Systems Interface (SCSI).

7. The method of claim 1 wherein monitoring the port-storage identifier further comprises:
intercepting a datastream passing though the port-storage identifier;
searching though the intercepted datastream for the data type; and
providing an indication that the data type has been located.

8. A method of designing a storage network, comprising:
collecting statistics on data and related data types associated with a port-storage identifier that references a particular combination of at least one initiator port from a server device and at least one target port from a virtual storage exchange device that transports data through the target port associated with the virtual storage exchange device and onto one or more storage devices in the storage network;
analyzing the data and data types associated with the port-storage identifier to determine data access patterns and bandwidth requirements as the data and data types pass through the storage network in accordance with the port-storage identifier;
developing a storage network architecture that fulfills a network design requirement for performance as measured by the data access patterns and bandwidth requirements resultant from the determination; and
operating the storage network architecture in accordance with the network design requirement and statistics collected on the data associated with the port-storage identifier, wherein the port-storage identifier includes a combination of one or more initiator ports, one or more target ports and one or more storage devices.

9. The method of claim 8 wherein the data collected includes organizational structures selected from a set including, frames, blocks and byte data.

10. The method of claim 9 wherein the organizational structures are read or written over the storage network.

11. The method of claim 8 wherein the data collected includes protocol commands including a read command and a write command.

12. The method of claim 11 wherein the protocol commands are compatible with one or more versions of Small Computer Systems Interface (SCSI).

13. A means for collecting information related to the operation of a storage network, comprising: means for identifying a data type transported on the storage network and used in analyzing data carried over the storage network; means for selecting a port-storage identifier that references a particular combination of one or more ports and one or more storage devices in the storage network to measure the data type transported across the storage network through a path described by the port-storage identifier; means for monitoring the port-storage identifier on the storage network for the data type to associate the data type with the path described by the port-storage identifier; and means for enumerating occurrences of the data type associated with the port-storage identifier while monitoring the port-storage identifier and the data type to determine how data is carried over the storage network, wherein the port-storage identifier includes a combination of one or more initiator ports, one or more target ports and one or more storage devices.

* * * * *